US006660200B2

(12) United States Patent
Nakajo

(10) Patent No.: US 6,660,200 B2

(45) Date of Patent: Dec. 9, 2003

(54) MANUFACTURING METHOD FOR SHEET SHAPED KEY TOP

(75) Inventor: Masaru Nakajo, Tokyo (JP)

(73) Assignee: Polymatech Co., LTD, Tokyo (JP)

( * ) Notice: Subject to any disclaimer, the term of this patent is extended or adjusted under 35 U.S.C. 154(b) by 0 days.

(21) Appl. No.: 10/372,354

(22) Filed: Feb. 24, 2003

(65) Prior Publication Data

US 2003/0137079 A1 Jul. 24, 2003

Related U.S. Application Data

(62) Division of application No. 09/814,368, filed on Mar. 21, 2001, now Pat. No. 6,576,856.

(30) Foreign Application Priority Data

Mar. 24, 2000 (JP) ....................................... 2000-084086
Mar. 24, 2000 (JP) ....................................... 2000-084426

(51) Int. Cl.[7] ......................... B29C 45/14; B29C 53/02; B29C 65/70

(52) U.S. Cl. ....................... 264/154; 264/263; 264/267; 264/268; 264/273; 264/275; 264/294

(58) Field of Search ................................ 264/138, 154, 264/163, 250, 251, 255, 263, 266, 267, 273, 274, 275, 294; 200/512, 311, 314, 341; 29/428, 464

(56) References Cited

U.S. PATENT DOCUMENTS

| | | | | | |
|---|---|---|---|---|---|
| 5,280,146 | A | * | 1/1994 | Inagaki et al. | 200/341 |
| 5,399,821 | A | * | 3/1995 | Inagaki et al. | 200/341 |
| 5,475,192 | A | * | 12/1995 | Inagaki et al. | 200/341 |
| 5,589,121 | A | * | 12/1996 | Inagaki et al. | 264/132 |
| 5,613,599 | A | * | 3/1997 | Inagaki et al. | 200/512 |
| 5,679,304 | A | * | 10/1997 | Watanabe et al. | 264/242 |
| 5,681,515 | A | * | 10/1997 | Pratt et al. | 264/153 |
| 5,807,002 | A | * | 9/1998 | Tsai | 400/494 |
| 6,023,033 | A | * | 2/2000 | Yagi et al. | 200/512 |
| 6,103,346 | A | * | 8/2000 | Nakajo et al. | 428/172 |
| 6,278,072 | B1 | * | 8/2001 | Nakajo | 200/341 |
| 6,576,856 | B2 | * | 6/2003 | Masaru et al. | 200/512 |

* cited by examiner

*Primary Examiner*—Angela Ortiz
(74) *Attorney, Agent, or Firm*—McGlew and Tuttle, P.C.

(57) ABSTRACT

A sheet shaped key top wherein molded resin key tops are arranged on a sheet, wherein the resin key top is fixed so as to cover the core upper part passing through the sheet, allowing to vary easily the key top design, and permitting a high manufacturing yielding, and a manufacturing method thereof.

4 Claims, 7 Drawing Sheets

MANUFACTURING METHOD FOR SHEET SHAPED KEY TOP

This is a divisional of application Ser. No. 09/814,368 filed Mar. 21, 2001 now U.S. Pat. No. 6,576,856 and the entire disclosure of this prior application is considered to be part of the disclosure of the accompanying application and is hereby incorporated by reference therein.

BACKGROUND OF THE INVENTION

1. Technical Field of the Invention

The present invention concerns a sheet shaped key top composed of integrally formed key top and sheet, constituting various press-button switches for various mobile communication equipment such as cellular phone, car phone, or the like, fixed telephone set, personal computer, controller, AV equipment, motor input switch or the like, and a manufacturing method thereof.

2. Prior Art

In recent years, according to minimization and mobilization of electric and electronic equipment, it is also required to miniaturize, and to reduce the thickness and weight of press-button switches used for their operation section.

To respond to this demand, conventionally, as shown in FIG. 14, it has been known a sheet shaped key top, wherein sheet and key top are formed integrally, by printing a display section 15 of predetermined characters and patterns at the surface or back of a sheet 21 made of flexible synthetic resin, bending this sheet 21 to the same shape as the top face of the key top element, and at the same time, directly heat fusing a key top element 17 made of thermoplastic injected in the bent portion, or fixing the key top element in the bent portion of this sheet with adhesive.

PROBLEMS TO BE SOLVED BY THE INVENTION

Conventionally, this kind of sheet shaped key top has be decorated only by printing on the sheet, and it has been impossible to respond to market needs such as metallic plating tone or complicated key top shape.

On the other hand, a key sheet wherein a molded rigid resin key top is glued on and integrated with a key pad. The rigid resin key top may presents a variety of decoration for the display section; however, the number of manufacturing process increased and it tended to make difficult to reduce the cost, because it is adhered to a flexible key pad made of elastic sheet such as elastomer or resin film. Moreover, there was no other means but to combine as another part, to form a pusher made of rigid resin under the key pad, lowering the production efficiency.

Still further, characters and patterns were easily enlarged or distorted, predetermined characters and patterns were printed on a sheet made of synthetic resin film, and then the sheet was bent upward with a thermoplastic resin under a high temperature and a high pressure. Moreover, in this composition, it was difficult to obtain those of a small interval between adjacent key tops, those with a high key top, or those of complicated shape, in respect of the forming.

MEANS TO SOLVE THE PROBLEMS

In order to solve the aforementioned problems, the present invention intends to provide a sheet shaped key top allowing to facilitate the key top positioning, stabilize the character and pattern quality of the display section, facilitate to diversify the key top design of coating layer, metal plating layer or the like, and at the same time, increase the production efficiency, and a manufacturing method thereof.

Moreover, it concerns a sheet shaped key top, composed by arranging a plurality of molded resin key tops on a single sheet, wherein at least one resin key top is fitted so as to cover the top of a core passing through the sheet.

Further, it concerns a sheet shaped key top, wherein a tip placed at a bottom of the core sheet is a pusher.

Still further, it concerns a sheet shaped key top, wherein the core and the resin key top are adhered with translucent adhesive.

Still further, it concerns a sheet shaped key top, wherein the core and the resin key top are made of thermoplastic resin or thermoplastic elastomer.

Still further, it concerns a sheet shaped key top, wherein the sheet is made of synthetic resin film and a core section is made of thermoplastic resin.

Still further, it concerns a illuminating sheet shaped key top, having a character illumination type key top display section wherein a predetermined character and pattern section is translucent while the part other than the predetermined character and pattern section is not translucent.

Still further, it concerns a illuminating sheet shaped key top, wherein the non translucent part of the key top display section is a plated layer of metal plating.

Still further, it concerns a illuminating sheet shaped key top, wherein the non translucent part of the key top display section is a coated layer of non translucent paint.

Also, it concerns a manufacturing method of a sheet shaped key top composed by arranging a molded resin key top on a sheet, comprising steps of pinching a sheet in a die, injecting thermoplastic resin or thermoplastic elastomer passing through the sheet from the surface side or back side of the sheet, forming a core integrated with the sheet, removing from the die, and fitting the resin key top so as to cover the upper portion of the core situated at the top of the sheet.

Further, it concerns a manufacturing method of a sheet shaped key top composed by arranging a molded resin key top on a sheet, comprising steps of bending the sheet to the same form as the top face of a key top element, pinching in a die so as to direct the bent portion to the top face side of the key top element, injection-molding the key top element with thermoplastic resin or thermoplastic elastomer, and at the same time, molding a core integrated with the sheet, by injecting thermoplastic resin or thermoplastic elastomer passing through the sheet from the back side of the sheet, removing from the die, and covering the upper portion of the core situated at the top of the sheet with resin key top.

Still further, it concerns a manufacturing method of a sheet shaped key top composed by arranging a molded resin key top on a sheet, comprising steps of setting the resin key top in a cavity of the die of the sheet surface side, injection-molding a core with thermoplastic resin or thermoplastic elastomer from the back side of the sheet pinched by the sheet, and integrating the sheet, core and resin key top in the die.

Still further, it concerns a manufacturing method of a sheet shaped key top composed by arranging a molded resin key top on a sheet, comprising steps of setting the resin key top in a cavity of the die of the sheet surface side, further, bending the sheet having a display section to the same form as the top face of the key top element, pinching in a die so as to direct the bent portion to the top face side of the key top element, integrating the sheet and the key top element by injection-molding the key top element with thermoplastic resin or thermoplastic elastomer, and at the same time, injection-molding the core passing through the sheet from the back side of the sheet, and integrating the sheet, core and resin key top in the die.

By the way, the sheet is preferably provided with a least one hole as the position where the core section is to be formed. The shape thereof is not particularly limited and it may be a round or square hole, or a simple cruciform notch.

DETAILED DESCRIPTION OF THE PREFERRED EMBODIMENTS

The present invention allows to add to a sheet shaped key top a decoration technique that can be used for the resin key top display section by forming a core with thermoplastic resin or thermoplastic elastomer passing through a sheet constituting the base, and integrating a resin key top whose surface is pattern decorated with character, pattern or the like.

Now, the present invention will be described in detail referring to drawings.

Figure 1:
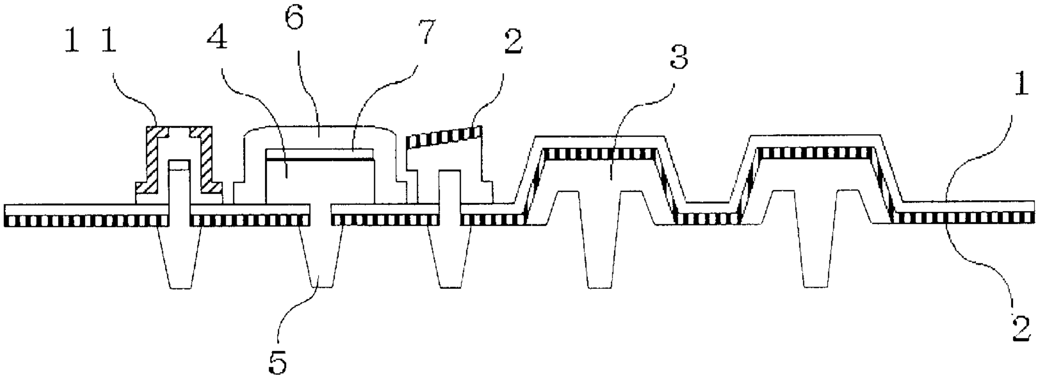
FIG. 1 shows a longitudinal cross section of an embodiment of the present invention.
Figure 2:
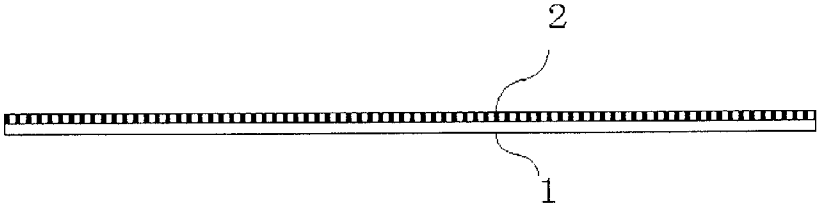
FIG. 2 shows an illustrative drawing of the manufacturing method of the present invention.
Figure 3:
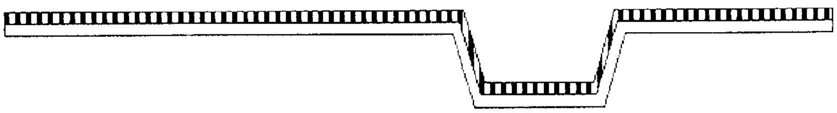
FIG. 3 shows an illustrative drawing of the manufacturing method of the present invention.
Figure 4:
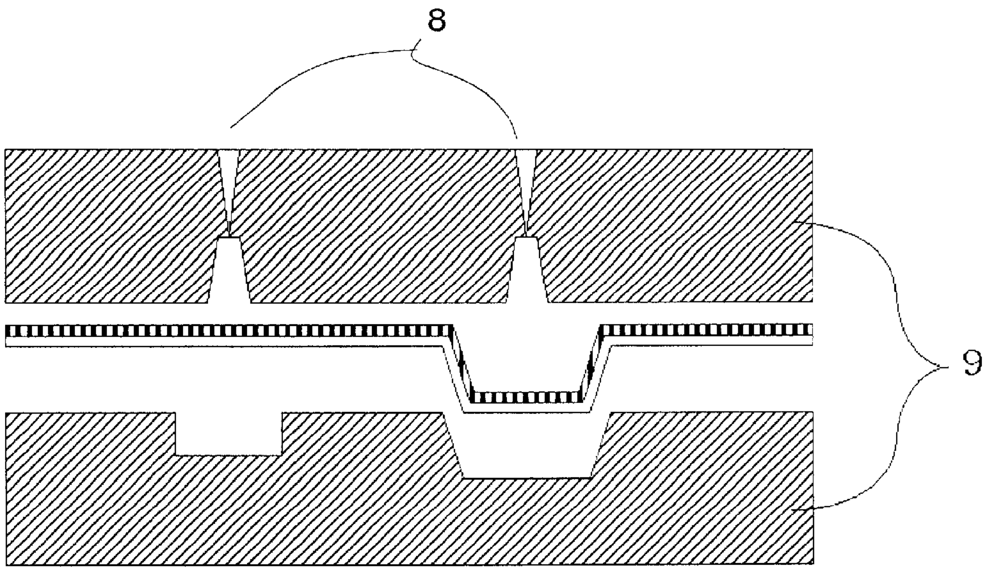
FIG. 4 shows an illustrative drawing of the manufacturing method of the present invention.
Figure 5:
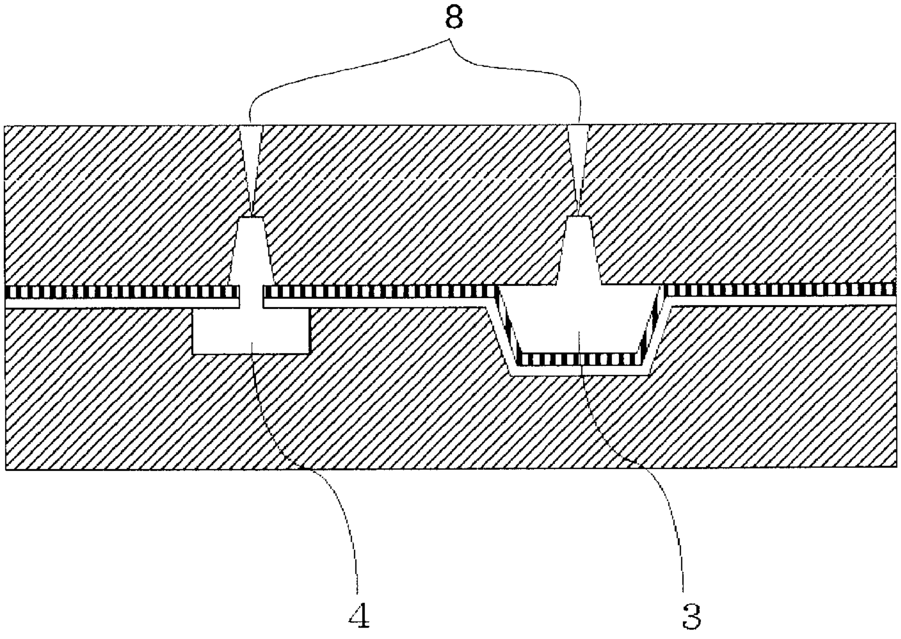
FIG. 5 shows an illustrative drawing of the manufacturing method of the present invention.
Figure 6:
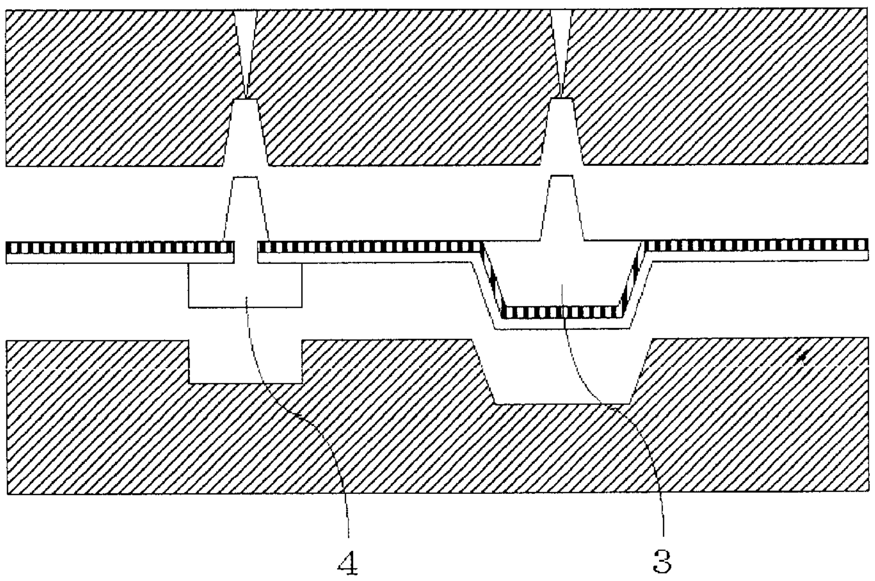
FIG. 6 shows an illustrative drawing of the manufacturing method of the present invention.
Figure 7:
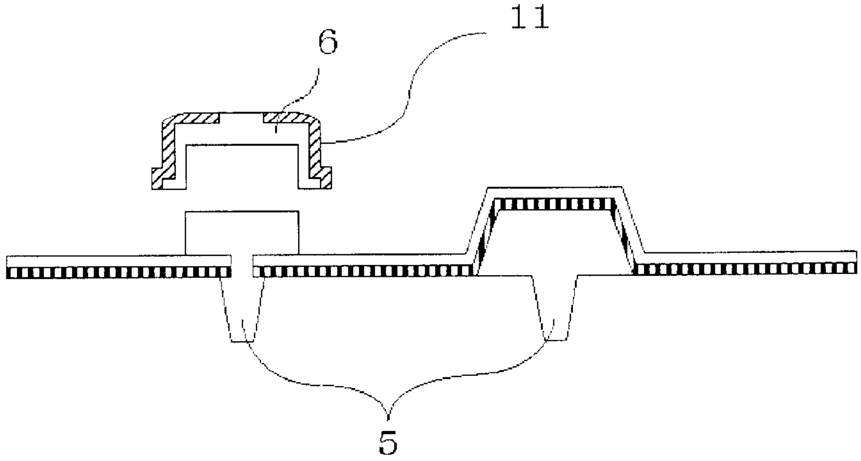
FIG. 7 shows an illustrative drawing of the manufacturing method of the present invention.
Figure 8:
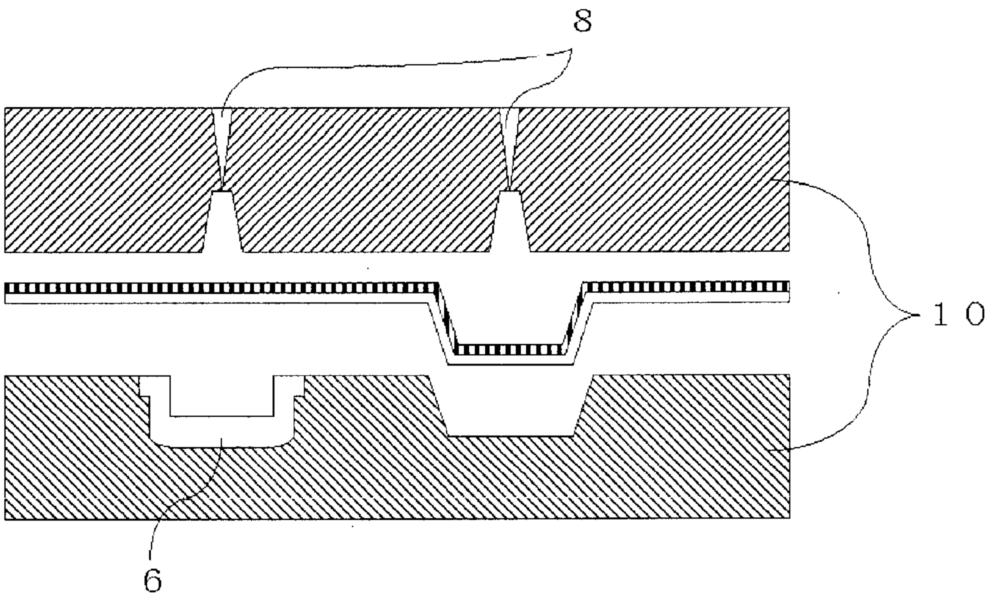
FIG. 8 shows an illustrative drawing of the manufacturing method of the present invention.
Figure 9:
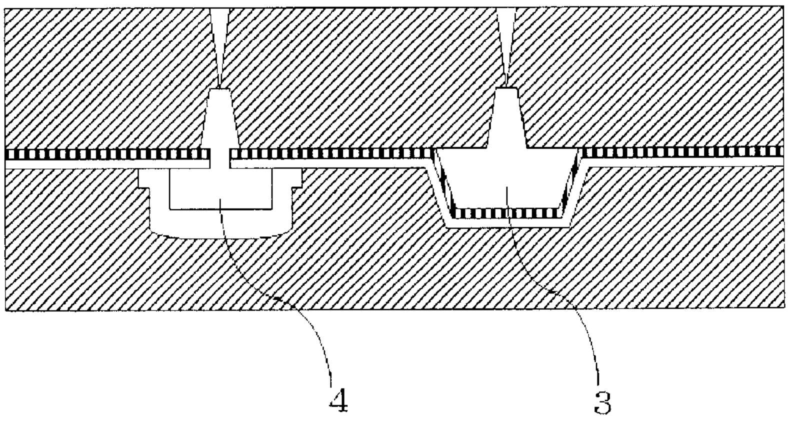
FIG. 9 shows an illustrative drawing of the manufacturing method of the present invention.
Figure 10:
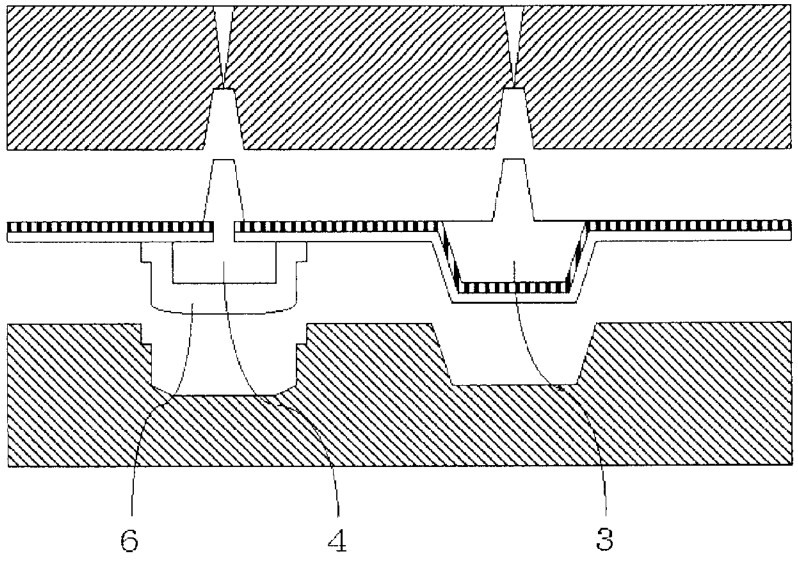
FIG. 10 shows an illustrative drawing of the manufacturing method of the present invention.
Figure 11:
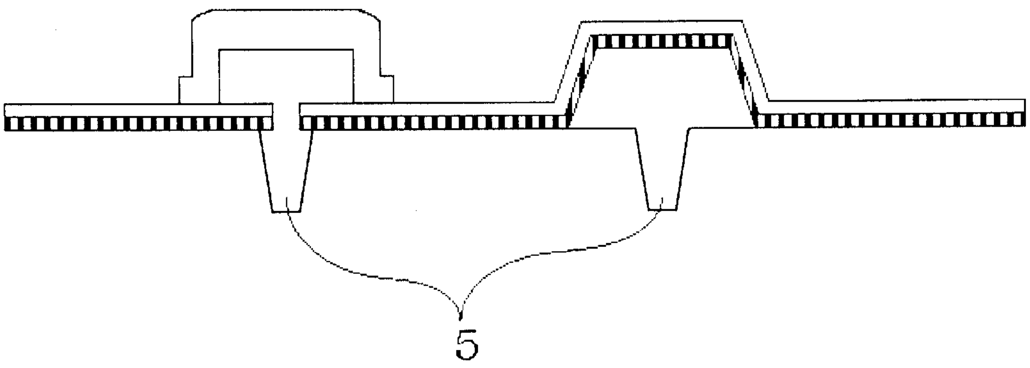
FIG. 11 shows a longitudinal cross section of an embodiment of the present invention.

An embodiment of a representative sheet shaped key top of the present invention will be described according to FIG. 1;

A part of a sheet 1 of the sheet shaped key top of the present invention has a display section 2 at the face or the back, bends in the same shape as the top face of a key top element, is integrated with the top face of the key top element 3, while another part is provided with a resin key top 6 fitted to the upper part, and a core 4 acting also as a tip 5 at the lower part situated at the sheet bottom. Resin key top can be arranged in a high density and respond to the designing such as metal plating, entire painting or the like, by fixing the resin key top 6 to the core 4 through an adhesive 7.

Figure 13:
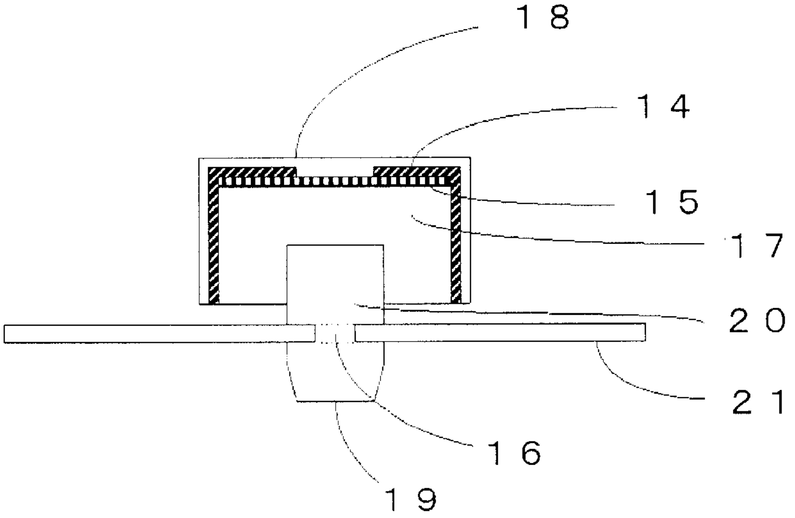
FIG. 13 shows a longitudinal cross section of an embodiment 4 of the present invention.
Figure 14:
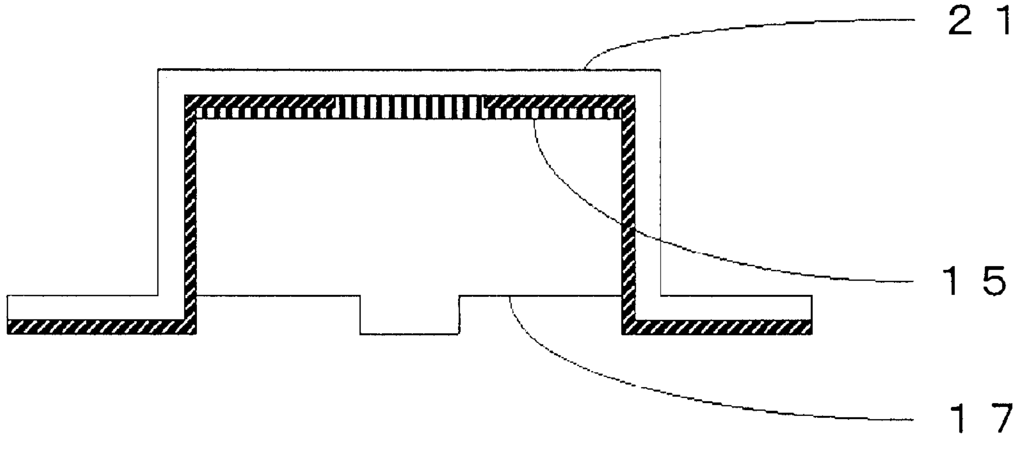
FIG. 14 PRIOR ART
FIG. 14 shows a longitudinal cross section of a conventional sheet shaped key top.

At this time, an engagement form of a core section and a coronary key top is not particularly limited, and the form that can be assembled easily is selected, and as for a means for fixing them, they can be glued using an adhesive, or engaged by their mutual form, or other means may be used. In addition, a protective layer 18 may be provided, to prevent the display section being worn by the contact with fingers or others (FIG. 13). Moreover, the tip protruding from the bottom of the sheet made of organic polymer of the core section may also serve as a pusher 19.

A representative manufacturing method of the present invention will be described using FIG. 2~FIG. 7. A desired position of a sheet 1 having a display section 2 is bent to the same shape as the top face of a key top element and pinched in a injection-molding die 9, and the key top element 3 is integrally formed by injecting thermoplastic resin or thermoplastic elastomer through an injection gate 8, and at the same time, a core 4 is shaped by passing the sheet at another position. After mold release, the resin key top 6 is fixed so as to cover the core upper part located at the sheet top face, to obtain a sheet shaped key top.

It is advantageous to provide a hole 16 to facilitate resin passing through the sheet during the injection. In addition, a protection layer 18 (FIG. 13) was formed as necessary on the surface of the display section by applying a transparent paint, or the like.

As the positioning for fixing the key top is performed by a core section formed on the sheet, the positioning is easier than the direct fixing of key top to the sheet, it can be fixed precisely without using a complicated positioning jig or the like. Therefore, it becomes unnecessary to assure a space for holding the key top with a positioning tool around the key top, and key tops can be arranged and fixed on the sheet without space.

Now, another manufacturing method of the present invention will be described referring to FIG. 2, FIG. 3, FIG. 8~FIG. 11. A desired position of a sheet 1 having a display section is bent to the same shape as the top face of a key top element, a separately molded resin key top 6 and the aforementioned sheet are pinched in a injection-molding die 10, and the key top element 3 is integrally formed by injecting thermoplastic resin or thermoplastic elastomer through an injection gate 8, and at the same time, a core 4 is molded by passing the sheet at the position of the resin key top 6, and the resin key top 6, core 4 and sheet 1 are fixed and molded integrally. After mold release, a sheet shaped key top is obtained.

Respective members composing the sheet shaped key top of the present invention will be described below.

The sheet of the present invention may be translucent or non-translucent provide that it is flexible, and films made of publicly known synthetic resin, or thermoplastic elastomer can be used. Preferably, the sheet is provided with at least one hole as the position where the core section is to be formed, and the form thereof is not particularly limited and in addition to a round or square hole, it may be a simple cruciform notch. The sheet thickness is preferably 50~200 $\mu$m. Less than 50 $\mu$m, the sheet often breaks when it is bent to the key top element shape, and more than 200 $\mu$m, the sheet becomes less flexible, disadvantageously.

The resin key top material of the present invention is not particularly limited, and publicly known synthetic resin, thermoplastic elastomer, synthetic rubber or other organic polymer can be used, however thermoplastic resin or thermoplastic elastomer are preferable. More preferably, they are translucent. When a predetermined character/pattern portion of the display section is to be illuminated from the back, at least the predetermined character/pattern portion is preferably translucent.

For the resin key top display section, various designs can be used by applying a translucent paint and then forming the predetermined character/pattern in plain or outline letters, entirely applying non-translucent paint and the forming the predetermined character/pattern by laser processing, forming the non translucent portion in outline letters by metal plating, or the like.

The material of the core and the key top element of the present invention is not particularly limited, and synthetic resin, thermoplastic elastomer; synthetic rubber or other organic polymer can be used, however thermoplastic resin or thermoplastic elastomer are preferable. More preferably, they are translucent. When the display section on the key top is to be illuminated from the back, it is preferably selected from translucent publicly known thermoplastic resin or thermoplastic elastomer. When sheet, display section and resin key top are fixed by heat fusion, the material is selected conveniently.

An upper part Shape of the core in the present invention can be cylindrical, prism, dome, or the like and not particularly limited, and any form that can facilitate to fit the resin key top by adhesion or engagement can be adopted. Further, the extremity shape of the tip section placed at the core sheet bottom or the lower part of the key top element serving also as pusher may be convex, flat, concave or the like and not particularly limited, but a convenient form can be adopted considering contact parts such as disk spring of the like disposed under them.

The core section of transparent translucent organic polymer is preferably formed using an organic polymer selected from translucent synthetic resin or thermoplastic elastomer, synthetic rubber. Among them, when the core section made of translucent thermoplastic resin is formed through at least one hole disposed in a sheet made of synthetic resin film, heat fusing integration can be realized by forming the core section by pinching the sheet in an injection-molding die and injecting translucent thermoplastic resin in the hole position.

EMBODIMENT 1

FIG. 2~FIG. 7 shows a sheet shaped key top of a first embodiment of the present invention and a manufacturing method thereof.

A desired point of a polycarbonate sheet 1 where a display section is printed is bent the same shape as a top face of the key top element, set in a die 9 and compressed, and then polycarbonate resin is injection molded through an injection gate 8, to form a key top element 3 in the sheet bent section, while the sheet is pierced at another position to form a core 4. After die decompression and ejection, a translucent adhesive 7 is applied in a concave section at the back of a resin key top 6 molded separately, decorated with a metal plating 11 as display section on the surface and then adhered to the upper section of the core to obtain a sheet shaped key top.

EMBODIMENT 2

FIG. 2, FIG. 3, FIG. 8~FIG. 11 shows a sheet shaped key top of a second embodiment of the present invention and a manufacturing method thereof.

A resin key top 6 made of polycarbonate resin, molded separately, and decorated with painting as display section on the surface is set at a desired position of a die 10, that is compressed, and then polycarbonate resin is injection molded through an injection gate 8, to form a key top element 3 in the sheet bent section, while the sheet is pierced to form a core 4. The core 4 upper part and the resin key top 6 are integrated by heat fusion, and taken out after the die decompression to obtain a sheet shaped key top.

EMBODIMENT 3

Figure 12:
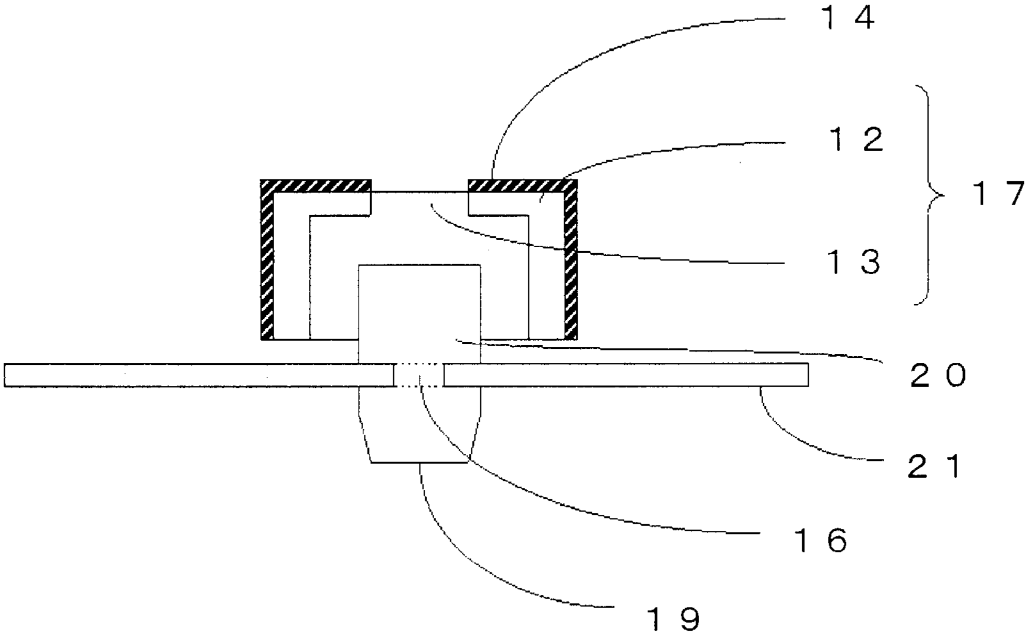
FIG. 12 shows a longitudinal cross section of an embodiment 3 of the present invention.

As shown in FIG. 12, a core section 20 made of translucent polycarbonate resin is formed on the sheet top face through a hole 16 provided in a sheet 21 made of polycarbonate, and in a way to covert the core section upper part, a coronary key top having a display section composed of chromium plating plated layer as a non-translucent layer 14 at the surface is fixed by a translucent cianoacrylate base adhesive. Further, it concerns a character illumination type illuminative sheet shaped key top wherein a tip formed at the sheet bottom made of polycarbonate film of the core section serves also as pusher 9.

Now, the manufacturing method of the EMBODIMENT 3 will be described.

A hole 16 is made in a sheet 21 made of flexible and translucent polycarbonate film and a core section 19 made of polycarbonate resin is formed so as to pass through this hole. Separately, as key top, a portion 12 other than a predetermined character and pattern section using acrylonitrile-butaziene-styrene (ABS) resin whose surface can be roughened easily as resin to be plated, the predetermined character and pattern section 13 is formed using non plating polycarbonate resin and formed in two colors, then as a non-translucent layer 14, the ABS resin portion is pretreated with a acidic solution and a chromium plated layer is formed thereon as display section, to form a coronary key top. The coronary key top is fixed by a translucent cianoacrylate base adhesive so as to covert the core upper part, to obtain a character illumination type illuminative sheet shaped key top.

EMBODIMENT 4

As shown in FIG. 13, a core section 4 made of translucent polycarbonate resin is formed through a hole 16 provided in a sheet 1 made of polyethylene terephthalate film, and in a way to covert the core section upper part, a coronary key top 17 having a display section composed of coating layer of non-translucent layer as a non-translucent layer 14 on the surface is fixed by a translucent acryl base adhesive. Further, it concerns a character illumination type illuminative sheet shaped key top wherein a tip formed at the sheet bottom made of polyethylene terephathalate film of the core section serves also as pusher 19.

Now, the manufacturing method of the EMBODIMENT 4 will be described.

A hole 16 is made in a sheet 21 made of flexible polyethylene terephathalate and a core section 20 made of polycarbonate resin is formed so as to pass through this hole. Separately, as key top, a coronary key top of polycarbonate resin is formed, a translucent layer 15 is printed on the top face thereof using white, green red or other translucent paints, thereafter a non-translucent paint is applied to the surface other than the back to form a non transparent layer. Then characters/patterns or the like are formed by laser light to make the display section and further, a transparent protection layer 18 is formed by coating, to mold a coronary key top 17. The coronary key top is fixed using translucent ultra-violet hardening adhesive so as to covert the core section upper part, to obtain a character illumination type illuminative sheet shaped key top.

In the sheet shaped key top of the present invention, as the resin key top is positioned for fixing by the core formed in the core, the positioning is easier than the direct fixing of the resin key top to the sheet, and it can be fixed precisely without using a complicated positioning jig or the like. Therefore, it becomes unnecessary to assure a space for holding the key top with a positioning jig around the key top, and key tops can be arranged and fixed on the sheet without space. A high density arrangement of the key top, conventionally impossible, became possible, and the design variation range was enlarge.

In the present invention, fixing so as to cover the core section integrated with the sheet, having the display section, made of organic polymer film, a stable quality display section of characters/patterns or the like can be formed with a high manufacturing yielding, and a thin and light press-button switch can be realized with a higher freedom degree for key top height or shape design. In addition, as for design processing of the key top display section, a variety of designs can be devised, as painting, plaiting or other processing is possible.

According to the manufacturing method of sheet shaped key top, as a separately formed resin key top is attached to a core formed on a sheet, a sheet shaped key top having a key top provided with a design proper to the resin key top and a pusher can be manufactured.

What is claimed is:

1. A manufacturing method of a sheet shaped key top composed by arranging a molded resin key top on a sheet, comprising steps of, pinching a sheet in a die, injecting thermoplastic resin or thermoplastic elastomer passing through the sheet from the surface side or back side of the sheet, forming a core integrated with the sheet, removing from the die, and fitting the resin key top so as to cover the upper portion of the core situated at the top of the sheet.

2. A manufacturing method of a sheet shaped key top composed by arranging a molded resin key top on a sheet, comprising steps of, bending the sheet to the same form as the top face of the key top element, pinching in a die so as to direct the bent portion to the top face side of the key top element, injection-molding the key top element with thermoplastic resin or thermoplastic elastomer, and at the same time, molding a core integrated with the sheet, by injecting thermoplastic resin or thermoplastic elastomer passing through the sheet from the back side of the sheet, removing from the die, and covering the upper portion of the core situated at the top of the sheet with resin key top.

3. A manufacturing method of a sheet shaped key top composed by arranging a molded resin key top on a sheet, comprising steps of, setting the resin key top in a cavity of the die of the sheet surface side, injection-molding a core with thermoplastic resin or thermoplastic elastomer from the back side of the sheet pinched by the sheet, and integrating the sheet, core and resin key top in the die.

4. A manufacturing method of a sheet shaped key top composed by arranging a molded resin key top on a sheet, comprising steps of, setting the resin key top in a cavity of the die of the sheet surface side, further, bending the sheet having a display section to the same form as the top face of the key top element, pinching in a die so as to direct the bent portion to the top face side of the key top element, integrating the sheet and the key top element by injection-molding the key top element with thermoplastic resin or thermoplastic elastomer, and at the same time, injection-molding the core passing through the sheet from the back side of the sheet, and integrating the sheet, core and resin key top in the die.

* * * * *